J. W. HARDWICK.
Hot-Water Heater for Buildings.
No. 200,391. Patented Feb. 19, 1878.
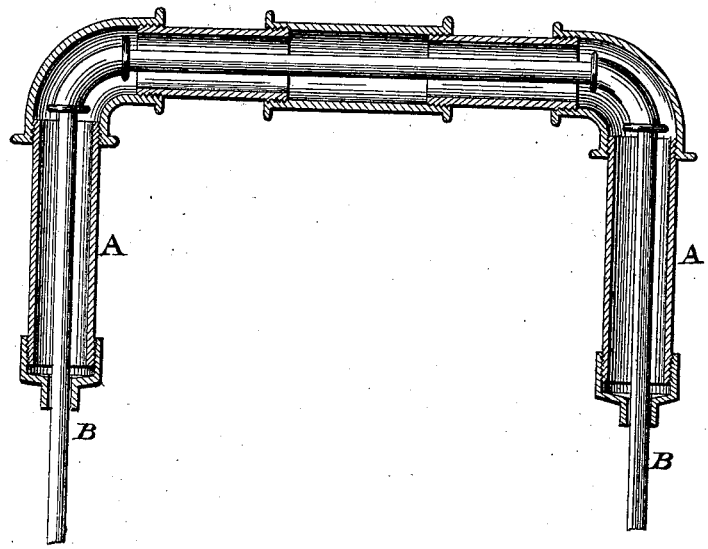
Witnesses:
Inventor:
Joseph Warren Hardwick

UNITED STATES PATENT OFFICE.

JOSEPH W. HARDWICK, OF WEYMOUTH, MASSACHUSETTS.

IMPROVEMENT IN HOT-WATER HEATERS FOR BUILDINGS.

Specification forming part of Letters Patent No. 200,391, dated February 19, 1878; application filed March 9, 1877.

*To all whom it may concern:*

Be it known that I, JOSEPH WARREN HARDWICK, of Weymouth, in the county of Norfolk, State of Massachusetts, have invented a new and useful Method of Heating with Hot Water Greenhouses, Graperies, or buildings of any description, which method is fully set forth in the following specification and accompanying drawing.

The object of my invention is to produce the desired amount of heat in a more expeditious, efficient, and economical manner than is now done by the common hot-water boilers with their flow and return pipes.

In lieu of hot-water pipes through which heated water is caused to circulate to and from a hot-water boiler, I propose to use a water-pipe which incloses a steam pipe or pipes leading from a steam-boiler, the water-pipe being provided with expansion-tanks similar to those now in use. The device thus is, in effect, a jacketed steam-pipe, with the space between the steam pipe or pipes and the outer jacket filled with water, which receives heat from the steam-pipe throughout the extent of the pipe, and imparts such heat to the surrounding atmosphere.

The system heretofore employed of heating by means of water circulating through pipes connecting with a hot-water boiler is open to serious objections. In the first place, it is very difficult, even by burning an immense amount of fuel, to heat a greenhouse above 55° Fahrenheit. The temperature of the house, owing to the long time it takes to get the heat through the water, cannot be raised appreciably in less than two or three hours, and it sometimes occurs in winter that when a sudden cold comes on, heat cannot be raised in time, and the plants are killed, even if enough heat could be got at all. Further, the heating of the water taking place at one spot, the greenhouse is heated unequally.

Under my invention, on the contrary, the heating agent is brought directly in contact with the water during its whole course, and as there is practically, for my purposes, no limit to the amount or temperature of the steam which can be driven through the pipe, I obtain any desired temperature in the house, and get it in a very short time. I also greatly economize the use of fuel.

The general arrangement that I propose to employ is shown in the accompanying drawing, in which A is the water pipe or jacket, to be provided with an expansion tank or tanks similar to those already in use, and to be carried or arranged around the green-house or other building, as with ordinary hot-water pipes; and B is the smaller steam-pipe, contained concentrically within the water-pipe, and designed to connect at its ends with a suitable steam-generator, so as to keep up a continuous flow of steam through the pipe, thus heating the water at the point where it is required to give out heat, and heating it, moreover, to any desired degree, this last result being produced by suitable means for controlling the flow of steam.

What I claim, and desire to secure by Letters Patent, is—

The improvement in the art of heating graperies, greenhouses, and other buildings by means of hot water, the same consisting in providing the structure to be heated with water-piping inclosing an inner pipe or pipes supplied with steam from a steam-generator or other source of steam-supply, as set forth.

JOSEPH WARREN HARDWICK.

Witnesses:
WILLIAM E. PARMENTER,
JOHN P. S. CHURCHILL.